(12) United States Patent
Higashi

(10) Patent No.: US 6,747,719 B2
(45) Date of Patent: Jun. 8, 2004

(54) LIGHT REFLECTING LAYER HAVING THIN METAL FILM DIRECTLY OR VIA A PRIMER COATING ON INDIVIDUAL PARTICLES OF SINGLE-LAYER COATING

(75) Inventor: Kensaku Higashi, Shizuoka (JP)

(73) Assignee: Tomoegawa Paper Co., Ltd., Tokyo (JP)

( * ) Notice: Subject to any disclaimer, the term of this patent is extended or adjusted under 35 U.S.C. 154(b) by 133 days.

(21) Appl. No.: 10/015,755

(22) Filed: Dec. 17, 2001

(65) Prior Publication Data

US 2002/0113925 A1 Aug. 22, 2002

(30) Foreign Application Priority Data

Dec. 19, 2000 (JP) ........................................ 2000-385120

(51) Int. Cl.⁷ .............................................. G02F 1/1335
(52) U.S. Cl. ........................ 349/113; 349/112; 428/323
(58) Field of Search ................................. 349/113, 112

(56) References Cited

U.S. PATENT DOCUMENTS

| | | | |
|---|---|---|---|
| 5,548,425 A | * 8/1996 | Adachi et al. | 349/112 |
| 5,714,247 A | * 2/1998 | Kuo et al. | 428/323 |
| 5,936,688 A | * 8/1999 | Tsuda et al. | 349/113 |
| 6,579,606 B1 | * 6/2003 | Uchiya et al. | 428/323 |

FOREIGN PATENT DOCUMENTS

| | | |
|---|---|---|
| JP | 53-79497 | 7/1978 |
| JP | 56-57084 | 5/1981 |
| JP | 57-151989 | 9/1982 |
| JP | 57-158237 | 9/1982 |
| JP | 4-212931 | 8/1992 |
| JP | 4-258901 | 9/1992 |
| JP | 4-267220 | 9/1992 |
| JP | 404267220 A | * 9/1992 |
| JP | 4-308816 | 10/1992 |
| JP | 4-315129 | 11/1992 |
| JP | 7-104272 | 4/1995 |
| JP | 10-161110 | 6/1998 |
| JP | 411002709 A | * 1/1999 |
| JP | 3092035 | 7/2000 |

* cited by examiner

Primary Examiner—Julie-Huyen L. Ngo
(74) Attorney, Agent, or Firm—McDermott, Will & Emery (57) ABSTRACT

The invention relates to a reflecting plate for a reflection type liquid crystal display device capable of reproducing paper whiteness, a production process thereof, and a reflection type liquid crystal display device making use of the reflecting plate. The light reflecting plate comprises a substrate, a single-layer powder coating provided on the substrate by laying powder particles in a state of a monoparticle layer on the substrate to fix them, and a thin metal film laminated directly or via a primer coating on the individual particles of the single-layer powder coating. It is produced by successively performing the steps of providing a binder layer having tackiness on a substrate, laying powder particles in a state of a monoparticle layer on the binder layer having tackiness to fix them, and laminating a thin metal film on the single-layer powder coating formed in the late step.

9 Claims, 6 Drawing Sheets

LIGHT REFLECTING LAYER HAVING THIN METAL FILM DIRECTLY OR VIA A PRIMER COATING ON INDIVIDUAL PARTICLES OF SINGLE-LAYER COATING

BACKGROUND OF THE INVENTION

1) Field of the Invention

The present invention relates to a light reflecting plate suitable for use in reflection type liquid crystal display devices, a production process thereof and a reflection type liquid crystal display device making good use of the light reflecting plate.

2) Description of the Related Art

Liquid crystal display devices are used in very various fields as displays for televisions, personal computer (PC) monitors, note type PC, pen-input PC, mobile PC, handheld game machines, digital cameras, cellular phones, etc., because they are light weight, thin and low electric power. Among these, with respect to the uses that attach great importance to portability, the so-call reflection type that external light is utilized for elongating the life of a battery quickly increases. In each of these reflection type liquid crystal display device, a light reflecting plate is arranged on the back surface of a liquid crystal, external light struck from the front side of each display device is reflected on the light reflecting plate to display it as an image to a viewer. These displays are roughly divided into a type that a reflecting plate is provided on the external side of a liquid crystal cell with a liquid crystal layer held between a pair of transparent substrates opposed to each other and each having a display electrode on the internal side thereof, and a type that a light reflection layer is provided on the side of one display electrode within the liquid crystal cell.

Figure 10:
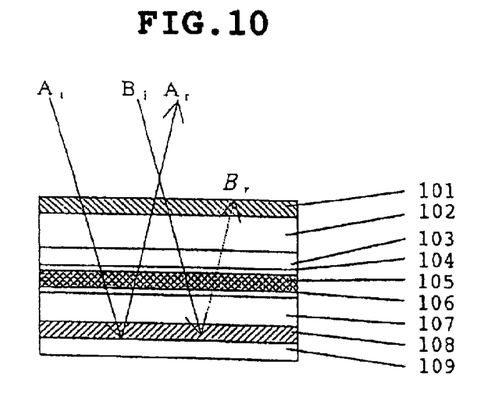
FIG. 10 is a cross-sectional view typically illustrating a conventional reflection type liquid crystal display.

The typical construction of the former type that the reflecting plate is provided on the external side of the liquid crystal cell is illustrated in FIG. 10. The liquid crystal cell is constructed by arranging a glass plate on one side of which a polarizing plate is provided and on the other side of which a transparent electrode is provided through a color filter, and a glass plate on one side of which a polarizing plate is provided and on the other side of which a transparent electrode is provided in such a manner that a liquid crystal is held between both transparent electrodes to form a liquid crystal layer. The reflecting plate is provided on the polarizing plate on the latter glass plate.

With respect to this display device, description is given by taking a TN liquid crystal the orientation direction of which is twisted by 90° between the upper and lower sides as an example. In the case where no voltage is applied, external light $A_i$ passes through the polarizing plate, liquid crystal and polarizing plate and is reflected on the reflecting plate, and the reflected light passes through the polarizing plate, liquid crystal and polarizing plate and is discharged from the display device as $A_r$. On the other hand, when voltage is applied to the liquid crystal, external light $B_i$ is incident through the same optical path as described above. However, the incident light is absorbed in the lower-side polarizing plate, and a part thereof is reflected. However, the reflected light is also absorbed in the upper-side polarizing plate. Therefore, outgoing light $B_r$ is scarcely observed, and so the reflected light from the display device can be viewed as an image.

By the way, as the reflecting plate essential for such a reflection type liquid crystal display device, is used a plate of a metal such as aluminum or a synthetic resin film deposited with a metal. When the metal surface of the reflecting plate is flat, however, the reflecting plate has involved problems that regular reflection is strong, and so an angle of field is narrow, and the visibility of an image formed is deteriorated because the glossy color of the metal as a ground is seen. Therefore, it is conducted to reduce the metallic gloss by mechanically rubbing the surface of an aluminum foil with a rotating brush to provide hairlines on the surface or depositing a metal on a matte-treated synthetic resin film. However, the effects thereof are not sufficient. Japanese Patent Application Laid-Open No. 158237/1982 has proposed an example that a metal deposited film is formed on a resin film containing an extremely fine particulate substance, Japanese Patent Application Laid-Open No. 79497/1978 an example that aluminum is deposited on an irregular surface composed of glass beads embedded in or bonded to a substrate, and Japanese Patent Application Laid-Open No. 151989/1982 an example that glass beads are attached to a thermoplastic resin layer in a state softened by a heated roll and surely stuck by reheating, and a metallic reflecting film is then formed on the surface thereof. However, these publications do not sufficiently show respective components and light-diffusive performance of the reflecting films, and so the action and effects thereof are indefinite. Therefore, it is hard to consider that all the proposals permit providing reflecting films having fixed reflection properties with good reproducibility. Further, Japanese Patent Application Laid-Open No. 258901/1992 discloses an example that a metal layer is provided on a coating layer formed of spherical fine particles and a binder, and Japanese Patent registration No. 3092035 an example that spherical fine beads are uniformly dispersed on the surface of a resin film or sheet, a transparent resin binder is filled between adjacent beads, and a thin metal film having a high reflectivity is then formed on the surface thereof. In any example, however, intervals among the spherical fine particles or beads which form irregularities, by which the light diffusion properties of the reflecting film are determined, cannot be sufficiently controlled, and so it is extremely difficult to provide reflecting films with good reproducibility.

Figure 11:
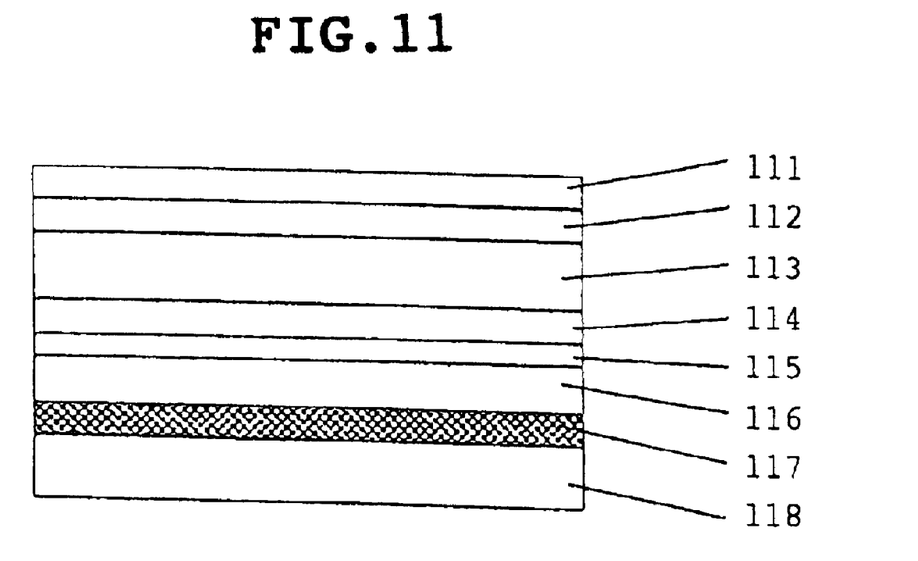
FIG. 11 is a cross-sectional view typically illustrating another conventional reflection type liquid crystal display.

On the other hand, the type that the light reflection layer is provided on the side of one display electrode within the liquid crystal cell can decrease one polarizing plate to brighten an image formed and can solve a problem of a twin image due to parallax. Therefore, the development of such a type has been recently advanced. The typical construction thereof is illustrated in FIG. 11. This liquid crystal cell has construction that a polarizing plate, a phase difference plate, a glass plate, a color filter, a transparent electrode, a liquid crystal layer, a reflecting electrode and a glass plate are laminated in that order. The reflecting electrode shown herein combines a display electrode function with a light reflecting function.

When the reflecting electrode is specular in the reflection type liquid crystal display device of this type, it is conducted to provide a light diffusing layer or a light diffusing film on the surface of the polarizing plate or between the polarizing plate and the phase difference plate, or the glass plate and the phase difference plate Japanese Patent Application Laid-Open Nos. 57084/1981, 104272/1995 and 161110/1998 show such cases. These cases involve problems that cost is increased by a share of the provision of the light diffusing layer or the light diffusing film, and moreover that the brightness and contrast of an image formed are lowered when it is intended to reduce the metallic gloss of the reflecting electrode. It is also conducted to provide irregularities in the reflecting electrode itself to impart light diffusing properties thereto. There have been known, for examples, a method in which a heat, honing or etching treatment is conducted after formation of a reflecting layer, an example that a reflecting layer is formed after a honing treatment, which is disclosed in Japanese Patent Application Laid-Open No. 212931/1992, and an example that a reflecting layer is provided after irregularities are formed by electron beam deposition. CVD or plasma CVD, which is disclosed in Japanese Patent Application Laid-Open No. 315129/1992. However, these cases have involved a problem that the treatments thereof are complicated, and so it is difficult to control the degree of the irregularities with good reproducibility. In addition, Japanese Patent Application Laid-Open Nos. 267220/1992 and 308816/1992 disclose an example that a thin metal film is provided on irregularities formed by applying an organic insulating film to which fine particles have been added. The mere application of a coating containing the fine particles fails to uniformly arrange the fine particles at a high density like the typical drawings shown in these publications. Accordingly, it is difficult to achieve reflection properties uniform and high in reproducibility.

As described above, both cases where the reflecting plate is arranged on the external side of the liquid crystal cell and where the reflecting electrode is provided within the liquid crystal cell have not yet come to realize paper white by completely losing the metallic gloss, and moreover it has been difficult to achieve the production stability thereof, i.e., to produce a reflecting plate or a reflecting electrode having uniform and fixed reflection properties with high reproducibility. In the reflection type liquid crystal display device, the dependency of preferable reflected light on angle varies according to the kind and use application of the liquid crystal display. However, it has been difficult to produce a reflecting plate having such many reflection properties by a simple technique in the prior art.

The present invention has been made in view of the foregoing circumstances in the prior art.

SUMMARY OF THE INVENTION

Accordingly, it is an object of the present invention to provide a reflecting plate for a reflection type liquid crystal display device capable of reproducing paper whiteness.

Another object of the present invention is to provide a production process of a reflecting plate, by which a reflecting plate having uniform and fixed reflection properties can be produced with good reproducibility.

A further object of the present invention is to provide a production process of a reflecting plate which can control reflection properties according to the kind of a liquid crystal display.

A still further object of the present invention is to provide a reflection type liquid crystal display device capable of reproducing paper whiteness.

According to the present invention, there is thus provided a light reflecting plate comprising a substrate, a single-layer powder coating provided on the substrate by laying powder particles in a state of a monoparticle layer on the substrate to fix them, and a thin metal film laminated on the single-layer powder coating.

In the light reflecting plate according to the present invention, the powder particles may preferably be spherical fine particles having a particle diameter of 1 to 20 µm. The substrate may preferably be in the form of a plate or film. The substrate and/or the powder particles may preferably have light transmission property. The thin metal film may preferably be formed from any one metal selected from the group consisting of gold, silver, aluminum and nickel.

According to the present invention, there is also provided a process for producing the light reflecting plate described above, which comprises a step of providing a binder layer having tackiness on a substrate, a step of laying powder particles in a state of a monoparticle layer on the binder layer having tackiness to fix them, and a step of laminating a thin metal film on the single-layer powder coating formed in the late step.

In the production process described above, the step of laying the powder particles in a state of a monoparticle layer on the binder layer having tackiness to fix them may preferably be a step of bringing the substrate provided with the binder layer having tackiness into contact with the powder particles and a medium vibrated in a container.

According to the present invention, there is further provided a first liquid crystal display device comprising a liquid crystal cell with a liquid crystal layer held between a pair of transparent substrates opposed to each other and each having at least a display electrode on the internal side thereof, and a light reflecting plate reflecting incident light, which is provided on the external side of one of the transparent substrates, wherein the light reflecting plate comprises a substrate, a single-layer powder coating provided on the substrate by laying powder particles in a state of a monoparticle layer on the substrate to fix them, and a thin metal film laminated on the single-layer powder coating.

According to the present invention, there is still further provided a second liquid crystal display device comprising a liquid crystal cell with a liquid crystal layer held between a pair of transparent substrates opposed to each other and each having at least a display electrode on the internal side thereof, and a light reflecting layer reflecting incident light, which is provided on the side of one display electrode within the liquid crystal cell, wherein the light reflecting plate comprises a substrate, a single-layer powder coating formed on the substrate by laying powder particles in a state of a monoparticle layer on the substrate to fix them, and a thin metal film laminated on the single-layer powder coating.

In the drawings, meanings of reference characters are as follows:

1: film base, 2, 2': rolls, 3: container, 4: mixture of powder particles and medium, 5: vibrating motor, 9: vibrating plate, 11: substrate, 12: single-layer powder coating, 13: thin metal film, 20: liquid crystal cell, 20a: adhesive, 21: display electrode, 22: glass plate, 23: display electrode, 24: glass plate, 25: liquid crystal layer, 29: light reflecting plate, 31: display electrode, 32: glass plate, 33: display electrode, 34: glass plate, 35: liquid crystal layer, 39: single-layer powder coating, 101: polarizing plate, 102: glass plate, 103: color filter, 104: transparent electrode, 105: liquid crystal layer, 106: transparent electrode, 107: glass plate, 108: polarizing plate, 109: light reflecting plate, 111: polarizing plate, 112: phase difference plate, 113: glass plate, 114: color filter, 115: transparent electrode, 116: liquid crystal layer, 117: light reflecting electrode, and 118: glass plate.

DETAILED DESCRIPTION OF PREFERRED EMBODIMENTS

Figure 1:
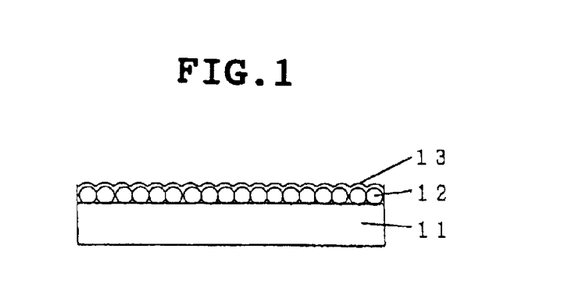
FIG. 1 is a cross-sectional view typically illustrating a light reflecting plate according to the present invention.

The light reflecting plate according to the present invention will be first described. FIG. 1 is a cross-sectional view typically illustrating the light reflecting plate according to the present invention. Powder particles are laid in a state of a monoparticle layer through a binder layer (not illustrated) having tackiness on a substrate 11 and fixed to the substrate to form a single-layer powder coating 12, and a thin metal film 13 is laminated on the single-layer powder coating.

In the light reflecting plate according to the present invention, the thin metal film layer is laminated on the powder particles forming the single-layer powder coating as illustrated in FIG. 1, and hence has an uneven surface by the influence of the powder particles, whereby light can be scattered to prevent specular reflection. In principle, this light reflecting plate is similar to that obtained by depositing a metal on a matte-treated film, which has been described previously. In the light reflecting plate according to the present invention, however, the irregularities of the thin metal film layer are close, and the size and depth of the irregularities of the thin metal film layer can be changed by changing the particle diameter of the powder particles forming the single-layer powder coating and the degree of projection of the powder particles from the binder layer. Accordingly, the reflecting plate has a great feature that the reflection properties can be controlled with ease and good reproducibility.

As the substrate making up the light reflecting plate according to the present invention, may be used various kinds of materials in the form of a board or film composed of a metal such as iron, aluminum, copper or stainless steel, a material such as paper, a synthetic resin, glass or ceramic, or a composite material thereof. Among these, a metal plate can be expected to increase the physical strength of the resulting display. The light reflecting plate according to the present invention may also be used as a reflection electrode. In such a case, a board or film of glass or a synthetic resin, which will be described subsequently, is preferably used as the substrate. In order to make the resulting display lightweight or thin, a board or film made of the synthetic resin is preferably used. Specific examples of the synthetic resin include polyethylene terephthalate (PET), polyethylene naphthalate, triacetyl cellulose, polycarbonate, polyarylate, polyimide, aromatic polyamide, polysulfone, poly(ether sulfone), cellophane, polyethylene (PE), polypropylene, polyvinyl alcohol, etc. These resins may be used either singly or in any combination thereof, or laminates of films formed of these resins may also be used. In the present invention, either a light transmitting (transparent) substrate or an opaque substrate may be used as the substrate. The thickness thereof is preferably within a range of 1 μm to 5 mm taking the productivity and profitability into consideration. In the present invention, the substrate may be subjected to a surface treatment or in a laminated state provided with other layers. Further, when the reflecting plate is used in a liquid crystal display device or the like, a transparent substrate formed of glass or a synthetic resin high in optical light transmission property is preferably used in combination with transparent powder particles.

As the powder particles forming the single-layer powder coating, may be used various kinds of materials such as inorganic materials and organic materials. Specific examples of the inorganic materials include metals such as aluminum, zinc, copper, gold, silver, nickel, tungsten, iron, cerium, titanium, bronze and brass, alloys thereof, oxides, nitrides and silicides thereof, carbon black, diamond, graphite, silica, glass, quartz, atomized kelmet, sodium montmorillonite, zircon sand, silicon carbide, boron carbide, silicon nitride, kaolin, talc, sericite, and calcium carbonate. Powder particles composed of organic materials are those formed of various kinds of synthetic resins. Specific examples of the synthetic resins include acrylic resins, polystyrene resins, styrene-acrylic copolymer resins, urethane resins, silicone resins, phenol resins, epoxy resins, polyethylene resins, polypropylene resins, polyethylene fluoride resins, polyvinylidene fluoride resins, urea resins, melamine resins, etc. As light transmitting materials, are preferred glass, quartz, acrylic resins, styrene resins, acrylicstyrene copolymer resins, silicone resins and the like, since they are high in optical transparency.

The particle diameter (volume average particle diameter) of the powder particles in the present invention is preferably within a range of 1 to 20 μm, more particularly 3 to 15 μm. If the particle diameter of the powder particles is smaller than the lower limit of this range, the degree of irregularities of the thin metal film is too small, and so the light diffusing performance of the resulting reflecting plate becomes insufficient, and light reflected comes to bear metallic gloss. In addition, it is extremely difficult to uniformly lay such fine particles in a state of a monoparticle layer from the viewpoint of production technique. If the particle diameter of the powder particles is greater than the upper limit of the above range on the other hand, the light diffusion becomes coarse on the contrary, and glare occurs, so that paper whiteness cannot be achieved.

In order to achieve reflection properties fine and high in uniformity in the light reflecting plate according to the present invention, it is necessary that the uniformity of irregularities in the single-layer powder coating corresponding to a lower layer of the thin metal film is high. Therefore, it is preferred that the powder particles laid in the state of the monoparticle layer on the substrate be spherical, particle diameters thereof be even, and the particle diameter distribution thereof be narrow. Specifically, the particle diameter distribution is preferably within a range of 0.8 to 1.0, more preferably 0.9 to 1.0. The roundness of the spherical powder particles is preferably at least 80%, more preferably at least 90%.

The particle diameter distribution of the powder particles is defined by the following equation (1):

Particle diameter distribution=(number average particle diameter)/(volume average particle diameter) (1)

wherein the number average particle diameter means an average value of diameters of 100 powder particles extracted at random, and the volume average particle diameter is determined by regarding each powder particle as a true sphere, calculating the total volume of 100 powder particles extracted at random from the diameters thereof, and accumulating the volumes of the individual particles from the powder particle of the smallest volume to regard a diameter of a particle at the time the accumulated volume reaches 50% of the total volume as the volume average particle diameter.

The roundness of the powder particles is defined by the following equation (2). Specifically, a powder particle sample is photographed by an optical microscope or transmission type electron microscope to obtain a projected image, and the roundness can be calculated from a projected area and a circumferential length of the powder particle sample, which are obtained by subjecting the projected image to an image analysis.

Roundness (%)=(4πA/B²)×100 (2)

wherein A is the projected area of the powder particle sample, and B is the circumferential length of the powder particle sample.

In the light reflecting plate of the present invention having the construction shown in FIG. 1, the side of the thin metal film may be used as a reflecting surface. When the substrate and powder particles are transparent, however, the reflecting plate may be turned reversely to use it so as to conduct incidence and reflection of light through the substrate.

In order to lay the powder particles in the state of the monoparticle layer on the substrate to fix them in the present invention, it is preferred that a binder layer having tackiness be provided on the substrate in advance. The term "tackiness" as used herein means that the binder layer has tackiness capable of attaching the powder particles to the substrate at normal temperature. Any material may be used so far as it is excellent in binding power to both substrate and powder particles. As specific example of a material for forming the binder layer having tackiness provided on the substrate, may be mentioned resinous pressure sensitive adhesives such as polyester resins, epoxy resins, polyurethane resins, silicone resins, rubbers and acrylic resins. These resin binders may be used either singly or in any combination thereof. In particular, the acrylic resin type pressure sensitive adhesive is preferred because it is excellent in water resistance, heat resistance and light resistance, good in adhesive strength and transparency and easy to control its refractive index so as to match its optical use application. As examples of the acrylic resin type pressure sensitive adhesive, may be mentioned homopolymers of acrylic monomers such as acrylic acid and esters thereof, methacrylic acid and esters thereof, acrylamide, and acrylonitrile, copolymers thereof, and copolymers of at least one of the acrylic monomers with vinyl acetate, maleic anhydride, or an aromatic vinyl monomer such as styrene. Particularly preferred are copolymers using a main monomer developing tackiness, such as ethyl acrylate, butyl acrylate or 2-ethylhexyl acrylate, a monomer used as a component for cohesive power, such as vinyl acetate, acrylonitrile, acrylamide, styrene, methyl methacrylate or methyl acrylate, and a functional group-containing monomer capable of improving adhesive strength and imparting a starting point of crosslinking, such as methacrylic acid, acrylic acid, itaconic acid, hydroxyethyl methacrylate, hydroxypropylmethacrylate, dimethylaminoethyl methacrylate, dimethylaminomethyl methacrylate, acrylamide, methylolacrylamide, glycidyl methacrylate or maleic anhydride, and having a Tg (glass transition temperature) ranging from −55 to −15° C. These acrylic pressure sensitive adhesives preferably have a weight average molecular weight of at least 250,000.

The resin used in the binder layer of the present invention preferably has Tg within a range of −55 to −15° C. as described above. If Tg of the pressure sensitive adhesive is lower than −55° C., or the weight average molecular weight of the resin constituting the pressure sensitive adhesive is lower than 250,000, the resulting binder layer becomes too soft, and so the powder particles attached once are separated by impact force of a medium, which will be described subsequently, to facilitate occurrence of defects such that the powder particles fall off. In addition, the pressure sensitive adhesive adheres to the powder particles separated once, and such powder particles may adhere again to the single-layer powder coating. In the too soft binder layer, the powder particles are turned on the surface of the binder layer by the impact of the medium, and so portions of the powder particles, to which the pressure sensitive adhesive adheres, appear on the surface, and the pressure sensitive adhesive exudes through interstices among the powder particles due to the impact powder of the medium or capillarity, so that other powder particles newly adhere thereto to easily become a double layer. The too soft binder layer is hence not preferable. On the other hand, any pressure sensitive adhesive having a Tg higher than −15° C. is not preferable because the powder particles cannot be stuck even by the impact powder of the medium due to its insufficient tackiness and powder particle embedding ability, and the powder particles are easy to separate in a step of removing excess powder particles, or the like. The adhesive strength (JIS Z 0237; 1980) of the binder layer is preferably at least 100 g/25 mm. If the adhesive strength is lower than 100 g/25 mm, separation of the powder particles is easy to occur. Such a low adhesive strength is hence not preferable.

In the pressure sensitive adhesive, one or more of crosslinking agents of, for example, the metal chelate type or epoxy type may be used as a hardening agent in combination as needed. As the pressure sensitive adhesive, may be used a photo-curable pressure sensitive adhesive obtained by adding a photo-polymerizable monomer, oligomer or polymer and a photo-polymerization initiator. To the pressure sensitive adhesive, may be added various additives such as a coupling agent, a surface tension adjustor, a coloring pigments, a dye, a wax, a thickener, an antioxidant, a rust preventive, an antibacterial agent and an ultraviolet absorbent as needed.

The binder layer may be formed by using a material which has tackiness upon the attachment of the powder particles, but no longer exhibits tackiness at normal temperature by curing it after the attachment of the powder particles in addition to the above-described pressure sensitive adhesive. Specific examples of such a material include UV-curable resins and heat-curable resins. The UV-curable resins are materials composed of a photo-polymerizable compound and a photo-initiator and polymerized and solidified by irradiation of ultraviolet rays or visible rays. They are roughly divided into a radical polymerization system and a cationic polymerization system from the reaction form of photo-polymerization.

A radical polymerizable compound used in the radical polymerization system is mainly a compound having at least one unsaturated double bond in its molecule. Specific examples thereof include acrylic oligomers called by the names of epoxy acrylate, polyurethane acrylate, polyester acrylate, polyether acrylate, polybutadiene acrylate, silicone acrylate, etc.; and acrylate monomers such as 2-ethylhexyl acrylate, isoamyl acrylate, butoxyethyl acrylate, ethoxydiethylene glycol acrylate, phenoxyethyl acrylate, tetrahydrofurfuryl acrylate, isonorbornyl acrylate, 2-hydroxyethyl acrylate, 2-hydroxypropyl acrylate, 2-acryloyloxyphthalic acid, dicyclopentenyl acrylate, triethylene glycol diacrylate, neopentyl glycol diacrylate, 1,6-hexanediol diacrylate, bisphenol A ethylene oxide (EO) adduct diacrylate, trimethylolpropane triacrylate, EO-modified trimethylolpropane triacrylate, pentaerythritol triacrylate, pentaerythritol tetraacrylate, ditrimethylolpropane tetraacrylate and dipentaerythritol hexaacrylate. These compounds may be used either singly or in any combination thereof. Incidentally, methacrylates corresponding to the above-described acrylates may also be used. However, the acrylates are preferred to the methacrylates because the photo-polymerization speed thereof is generally faster.

As a cationically polymerizable compound used in the cationic polymerization system, may be used a compound having at least one epoxy, vinyl ether or oxetane group in its molecule. Examples of the compound having at least one epoxy group include 2-ethylhexyl diglycol glycidyl ether, biphenyl glycidyl ether, and diglycidyl ethers of bisphenols such as bisphenol A, hydrogenated bisphenol A, bisphenol F, bisphenol AD, bisphenol S, tetramethylbisphenol A, tetramethylbisphenol F, tetrachlorobisphenol A and tetrabromobisphenol A; polyglycidyl ethers of novolak resins such as phenol novolak, cresol novolak, brominated phenol novolak and o-cresol novolak; diglycidyl ethers of alkylene glycols such as ethylene glycol, polyethylene glycol, polypropylene glycol, butanediol, 1,6-hexanediol, neopentyl glycol, trimethylolpropane, 1,4-cyclohexane dimethanol, EO adducts of bisphenol A and propylene oxide adducts of bisphenol A; and glycidyl esters such as hexahydrophthalic acid glycidyl ester and dimeric acid diglycidyl ester.

Further, alicyclic epoxy compounds such as 3,4-epoxycyclohexyl methyl-3', 4'-epoxycyclohexane-carboxylate, 2-(3,4-epoxycyclohexyl-5,5-spiro-3,4-epoxy) cyclohexane-meta-dioxane, di(3,4-epoxycyclohexylmethyl) adipate, di(3,4-epoxy-6-methylcyclohexylmethyl adipate, 3,4-epoxy-6-methylcyclohexyl-3',4'-epoxy-6'-methyl cyclohexane-carboxylate, methylenebis(3,4-epoxycyclohexane), dicyclopentadiene diepoxide, di(3,4-epoxycyclohexyl-methyl) ether of ethylene glycol, ethylenebis(3,4-epoxycyclohexanecarboxylate), lactone-modified 3,4-epoxycyclohexyl methyl-3', 4'-epoxycyclohexane-carboxylate, tetra(3,4-epoxycyclohexylmethyl) butanetetracarboxylate and di(3,4-epoxycyclohexyl-methyl)-4,5-epoxytetrahydrophthalate may also be used. However, the epoxy compounds are not limited to these compounds.

Examples of the compound having at least one vinyl ether group include diethylene glycol divinyl ether, triethylene glycol divinyl ether, butanediol divinyl ether, hexanediol divinyl ether, cyclohexane dimethanol divinyl ether, hydroxybutyl vinyl ether, ethyl vinyl ether, dodecyl vinyl ether, trimethylolpropane trivinyl ether and propenyl ether propylene carboante. However, such compounds are not limited to these compounds. Incidentally, vinyl ether compounds are generally cationically polymerizable, but may be radical-polymerized by combining them with an acrylate.

As the compound having at least one oxetane group, may be used 1,4-bis[(3-ethyl-3-oxetanyl-methoxy) methyl] benzene, 3-ethyl-3-(hydroxymethyl) oxetnane or the like.

Incidentally, the cationically polymerizable compounds described above may be used either singly or in any combination thereof.

Examples of the photo-initiator used together with the radical polymerizable compound include benzophenone, benzyl, Michler's ketone, 2-chloro-thioxanthone, 2,4-diethylthioxanthone, benzoin ethyl ether, benzoin isopropyl ether, benzoin isobutyl ether, 2,2-diethoxyacetophenone, benzyl dimethyl ketal, 2,2-dimethoxy-1,2-diphenylethane-1-one, 2-hydroxy-2-methyl-1-phenylpropane-1-one, 1-hydroxy-cyclohexyl phenyl ketone, 2-methyl-1-[4-(methylthio)phenyl]-2-morpholinopropanone-1, 1-[4-(2-hydroxyethoxy) phenyl]-2-hydroxy-2-methyl-1-propan-1-one, bis($\eta^5$-2,4-cyclopentadien-1-yl)-bis[2,6-difluoro-3-(1H-pyrrol-1-yl)phenyl]titanium, 2-benzyl-2-dimethylamino-1-(4-morpholinophenyl)butanone-1and 2,4,6-trimethylbenzoyldiphenylphosphine oxide. These compounds may be used either singly or in any combination thereof.

The photo-initiator used together with the cationically polymerizable compound is a compound which generates an acid by light irradiation and can polymerize the above-described cationically polymerizable compounds by the acid generated. In general, onium salts and metallocene complexes are preferably used. As the onium salts, may be used diazonium salts, sulfonium salts, iodonium salts, phosphonium salts, selenium salts, etc. As a counter ions to these compounds, may be used anions such as $BF_4^-$, $PF_6^-$, $AsF_6^-$ and $SbF_6^-$. Specific examples of the onium salts include 4-chlorobenzenediazonium hexafluorophosphate, triphenylsulfonium hexafluoroantimonate, triphenylsuflonium hexafluoro-phosphate, (4-phenylthiophenyl) diphenylsulfonium hexafluoroantimonate, (4-phenylthiophenyl)diphenyl-sulfonium hexafluorophosphate, bis[4-(diphenyl-solfonyl)phenyl] sulfide-bis-hexafluoroantimonate, bis[4-(diphenylsulfonyl) phenyl]sulfide-bis-hexafluorophosphate, (4-methoxyphenyl)diphenyl-sulfonium hexafluoroantimonate, (4-methoxyphenyl)-phenyliodonium hexafluoroantimonate, bis(4-t-butylphenyl)iodonium hexafluorophosphate, benzyltriphenylphosphonium hexafluoroantimonate, triphenylselenium hexafluorophosphate and ($\eta^5$-isopropylbenzene) ($\eta^5$-cyclopentadienyl)iron (II) hexafluorophosphate. However, the photo-initiators are not limited thereto. These compounds may be used either singly or in any combination thereof.

In the present invention, the photo-initiator is incorporated in a proportion of the order of 0.01 to 10 parts by weight, preferably 0.1 to 7 parts by weight, more preferably 0.1 to 5 parts by weight per 100 parts by weight of the photo-polymerizable compound. If the amount of the photo-initiator incorporated is less than 0.01 parts by weight, the photo-curability of the resulting binder layer is deteriorated. If the amount exceeds 10 parts by weight, only the surface of the resulting binder layer is cured, and the curability of the interior thereof is deteriorated. These photo-initiators are generally used by directly dissolving them in a powdered state in the photo-polymerizable compound. When the solubility of the initiator is poor, however, such a photo-initiator may also be dissolved at a high concentration in an extremely small amount of a solvent in advance to use it. It is more preferable that such a solvent be photo-polymerizable, and specific examples thereof include propylene carbonate and γ-butyrolactone. In order to improve the photo-polymerizability, publicly known various dyes and sensitizers may also be added. A heat-curable initiator capable of curing the photo-polymerizable compound by heating can also be used in combination with the photo-initiator. In this case, it can be expected that the polymerization and curing of the photo-polymerizable compound are more facilitated and completed by heating after photo-curing.

To the UV-curable resin described above, the above-described pressure sensitive adhesive and a polymer having good compatibility with the UV-curable resin may be added, as needed, so as to permit attaching the powder particles before UV-curing. Specific examples thereof include acrylic resin, polyurethane resins, polyester resins, epoxy resins, cellulosic resins, vinyl acetate resins, vinyl chloride-vinyl acetate copolymers and polyvinyl butyral resins.

The thickness of the binder layer is preferably 0.01 to 2 times as much as the particle diameter of the powder particles fixed therein. If the thickness of the binder layer is thinner than 0.01 times as much as the particle diameter of the spherical powder particles, the powder particles tend to separate upon attaching the powder particles to the binder layer having tackiness. If the thickness is greater than 2 times as much as the particle diameter on the other hand, the powder particles are too deeply embedded to achieve the state that the surfaces of the particles are projected, or the pressure sensitive adhesive exudes out of the surface of the single-layer powder coating, and other powder particles adhere thereto, whereby a possibility that the single-layer powder coating may not be obtained becomes high. Therefore, such a small or great thickness is not preferable.

In the present invention, the fixing of the powder particles may also be conducted by using a synthetic resin material as the substrate and embedding the powder particles in the surface thereof. For example, the surface of a filmy base composed of the synthetic resin is melted or softened by heating or a solvent, the powder particles are attached in such a state, and the synthetic resin is then set by cooling or evaporation of the solvent, whereby the powder particles may be fixed.

The thin metal film laminated on the single-layer powder coating will now be described. As a material for the thin metal film, may be used a metal selected from the group consisting of gold, silver, aluminum, nickel and chromium because they have high light reflecting ability. The thickness of the thin metal film is preferably within a range of 500 to 1,500 Å.

The production process of the light reflecting plate according to the present invention will now be described. As a first step, a binder layer having tackiness is first provided on the substrate described above. This binder layer is formed by applying the above-described pressure sensitive adhesive. In order to obtain a binder layer having a proper thickness, the pressure sensitive adhesive may be diluted with an organic solvent as needed. Specific examples of usable solvents include alcohols such as methanol, ethanol, propanol and butanol, ketones such as methyl ethyl ketone, methyl isobutyl ketone and cyclohexanone, esters such as ethyl acetate, propyl acetate and butyl acetate, hydrocarbons such as toluene and xylene, and ethers such as methyl cellosolve, ethyl cellosolve, butyl cellosolve and tetrahydrofuran.

Various kinds of coating methods and printing methods may be used for providing the binder layer having tackiness on the substrate. Examples of the coating methods include air doctor coating, blade coating, knife coating, reverse coating, gravure coating, microgravure coating, kiss coating, spray coating, dam coating, dip coating and die coating. As the printing methods, may be used relief printing such as flexographic printing, intaglio printing such as direct gravure printing, offset gravure printing, lithographic printing such as offset printing, and stencil printing such as screen printing. These coating methods and printing methods are generally conducted while moving the substrate in the form of a film at a certain rate. However, the sending of the substrate may also be intermittently conducted according to the system of the coating or printing.

In the case where the pressure sensitive adhesive is applied to the substrate in the form of a film, it is preferable that coating and drying be conducted by a roll-to-roll system, a release film be laminated on the binder layer formed, and the resultant laminate be taken up. Accordingly, in order to lay the powder particles in the state of the monoparticle layer on the binder layer, the filmy substrate, on which the binder layer having tackiness has been formed, is taken up in a state of a roll once, the rolled substrate is then rewound to separate the release film, and the powder particles are attached to the exposed surface of the binder layer according to a method which will be described subsequently. Alternatively, the binder layer having tackiness provided on the release film in advance by coating is laminated on the substrate, and the release film is then separated, whereby the binder layer may also be provided on the substrate by transfer.

In the next step, the powder particles are then laid in a state of a monoparticle layer on the formed binder layer having tackiness to fix them. As specific methods thereof, may be mentioned a method in which the binder layer is brought into contact with the powder particles in a container containing the powder particles, a method in which the substrate is passed through the powder particles, and a method in which the powder particles are sprayed on the binder layer. In addition, a method in which the powder particles are fluidized in a container by vibration or fluidizing air, and the substrate is passed through the fluidized powder particles may also be adopted. In the case where the particle diameter of the powder particles is small, the method making use of the fluidizing air is more efficient. Further, a method in which the powder particles are blown against the binder layer by an air spray may also be adopted. This method is preferred for the purpose of uniformly attaching the powder particles on the binder layer because mixing with air is easy. It may also be conducted to bring the powder particles attached to the surface of a transfer roll or on a magnetic brush into contact with the binder layer to transfer them.

In the case where difficulty is encountered on the provision of the single-layer powder coating by laying the powder particles in the state of a monoparticle layer on the substrate to fix them by only the methods described above, it is effective to bring the binder layer into contact with the powder particles and a medium, which are being vibrated in a container. The term "medium" as used herein means a medium serving to strike the powder particles by impact power generated by vibrating it to embed the powder particles in the binder layer, and particularly press other powder particles into spaces among powder particles first attached to the binder layer to more enhance the filling density of the powder particles in the single-layer powder coating and evenly lay them. As the medium, is used a spherical material having a diameter of 0.1 to 3.0 mm. In order to embed the powder particles in the binder layer at a high filling rate to an even depth, it is preferable that the spherical material also has high particle diameter distribution and roundness though the degree thereof may be poorer than the powder particles. Any medium having a diameter smaller than 0.1 mm adheres to the binder layer together with the powder particles, is insufficient in the ability to embed the powder particles in the binder layer and involves a problem from the viewpoint of handling because it is too small. On the other than, any medium having a diameter greater than 3.0 mm has sufficiently great impact power, but on the contrary, it is difficult to embed the powder particles in the binder layer at a high filling rate to an even depth. Therefore, such a small or great medium is not preferred.

Specific examples of the medium include those composed of iron, carbon steel, alloy steel, copper or copper alloy, aluminum or aluminum alloy, or any other various metal and alloy, those composed of alumina, silica, titania, zirconia or ceramic such as silicon carbide, and those composed of glass, quartz, hard plastic or hard rubber. With respect to the hard plastic and hard rubber, those containing fine particles of any of the above-mentioned various metals and alloys, ceramic, glass or the like therein may also be used.

Both powder particles and medium are sufficiently mixed by vibrating them in a container to become a state that the powder particles adhere to the surface of the medium. When the binder layer having tackiness or a binder layer, to which the powder particles have been attached in advance by the method described above, is placed in the container, the powder particles are embedded in the binder layer by the action of the medium, whereby a uniform single-layer powder coating high in the filling density of the powder particles can be obtained. When the powder particles are mixed with the medium, the mixing proportion thereof may be suitably preset according to the particle diameter and material of the medium, the particle diameter of the powder particles, and the like so as to obtain the desired single-layer powder coating.

The container, in which the powder particles and the medium are contained, may be of any material and size so far as it can withstand the weight of both components and vibration. However, the form thereof must be devised according to the method of bringing the binder layer having tackiness into contact with the vibrated powder particles and medium. In particular, when the container itself is vibrated to transfer the power thereof to the powder particles and medium, thereby embedding the powder particles in the surface of the binder layer, it is preferable that a distance between the wall surface of the vibrating container and the binder layer be constant through the powder particles and medium for the purpose of imparting even impact power to the binder layer. A separate vibrating member such as a vibrating plate may also be provided in the container without vibrating the container to vibrate the powder particles and medium by this vibrating member. In such a case, however, the installing position thereof and the distance from the binder layer should be considered so as to give the surface of the binder layer on the substrate even power. It is also necessary to devise the container so as not to escape the powder particles and medium out of the container when vibrating them.

Any publicly known vibrating device such as a vibrating motor, a vibrator, an electromagnetically vibrating device or a mechanical vibrating device making use of a cum may be used for vibrating the container containing the powder particles and medium or the vibrating member installed in the container. These vibrating devices are used in a wide variety of fields such as feeders, hoppers, conveyers, sieves, part feeders, part aligners, vibrating tables and barrel polishing. In the present invention, it is only necessary to select a suitable device from among these devices in view of the size of the substrate, the sizes and weights of the medium and container, and the structure of the device including these factors, etc. In any device, it is necessary to control the vibration mode, vibrating power and amplitude through the installing position of the vibrating device to the container, selection of a spring, etc. for the purpose of embedding the powder particles in the binder layer at a high filling rate to an even depth. The frequency is preferably 200 to 4,000 rpm, more preferably 1,000 to 3,000 rpm. If the number of vibration is smaller than 200 rpm, the power of the medium for embedding the powder particles in the binder layer becomes weak, and it takes a long time for the treatment. Therefore, such a small number of vibration is not preferable. Any number of vibration exceeding 4,000 rpm is not preferable because of causing a problem that the impact power becomes too great, so that the powder particles are easy to separate from the binder layer, or that the vibration from the vibrating member is absorbed in the medium on the contrary to become hard to reach the binder layer. In order to stably conduct embedding of the powder particles in the binder layer, it is necessary that the powder particles and medium are not escaped out of the container, and they are prevented from being separated from each other or being biased in the container. In addition, it is preferable that the powder particles and medium be slowly vibrated so as to change portions coming into contact with the binder layer.

When the substrate, on which the binder layer having tackiness has been provided, is in the form of a board poor in flexibility, a sheeting operation that the substrate is charged one by one into the container, in which the powder particles and medium are being vibrated, and this substrate is taken out after holding it for a certain period of time, is conducted. In the case of a flexible filmy substrate, however, a roll-to-roll system that the continuous filmy substrate is passed at a certain rate through the container, in which the powder particles and medium are being vibrated is preferred because of its high productivity.

Figure 4:
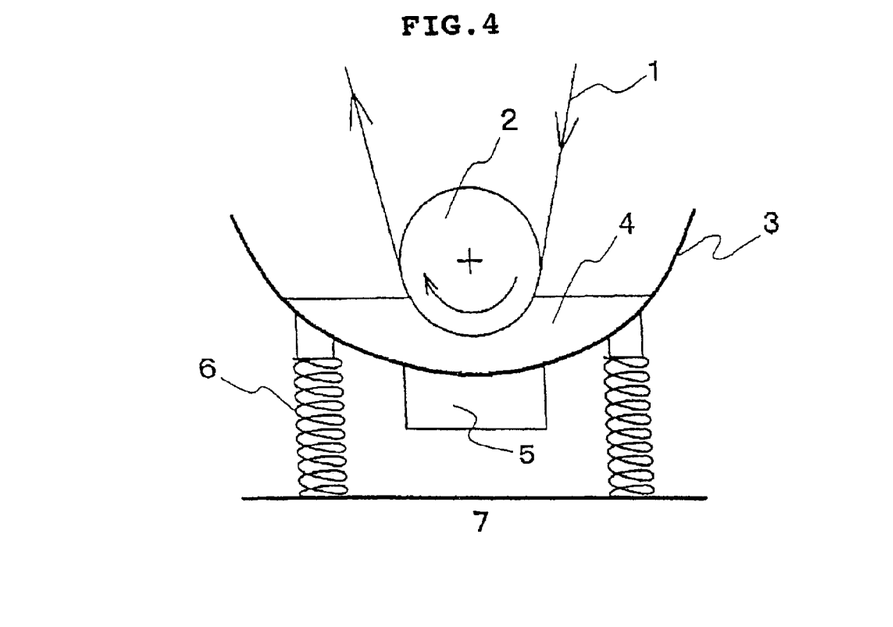
FIG. 4 schematically illustrates the construction of an exemplary apparatus for attaching powder particles.

The process of bringing the binder layer into contact with the powder particles and medium vibrated in the container will hereinafter be specifically described by reference to drawings. FIG. 4 schematically illustrates the construction of an exemplary apparatus for attaching powder particles to a filmy substrate provided with a binder layer having tackiness. The filmy substrate 1 provided with a binder layer having tackiness is brought into contact with a roll 2 in such a manner that the binder layer is reversed to the roll 2, and the roll 2 is immersed to a depth about a third of the diameter of the roll 2 in a mixture 4 of the powder particles and the medium to move the substrate 1. The roll 2 is installed in a frame separate from a container 3 so as to prevent vibration from being directly transmitted. A vibrating motor 5 is integrally attached just under the container, and these members are fixed to a floor 7 through a spring 6. Since the binder layer is reversed to the roll 2, the filmy substrate 1 is passed through the vibrating mixture 4 of the powder particles and medium, whereby the powder particles are embedded in the binder layer. In this embodiment, the reason why the immersion of the roll in the mixture of the powder particles and medium is controlled to the depth about a third of the diameter of the roll is that the powder particles are prevented from being attached to a surface opposite to the binder layer of the film.

Figure 5:
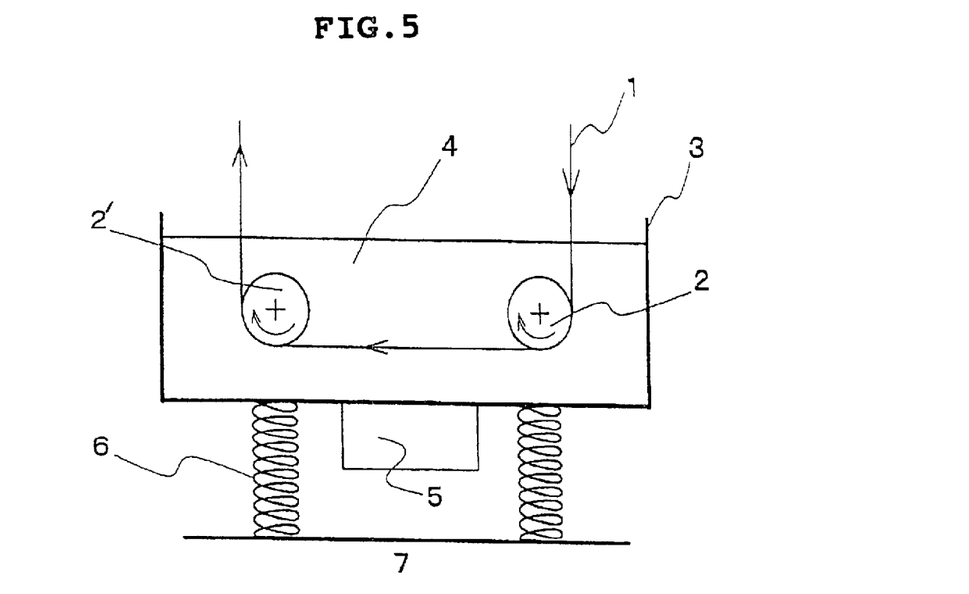
FIG. 5 schematically illustrates the construction of another exemplary apparatus for attaching powder particles.

FIG. 5 schematically illustrates the construction of another exemplary apparatus for attaching powder particles to a filmy substrate provided with a binder layer having tackiness. In this apparatus, at least two rolls 2, 2' installed in a frame separate from a vibrating container greater than that in FIG. 4 are arranged in the container, and the filmy substrate 1 provided with the binder layer having tackiness is passed through a mixture 4 of the powder particle and medium. This method is equal to the case in FIG. 4 in principle. However, it has a merit that a distance of the filmy substrate 1 immersed in the mixture 4 of the powder particles and medium is longer than the case in FIG. 4, and a chance of embedding the powder particles is increased, so that the feeding speed of the film can be increased. Incidentally, like reference characters have the same meanings as in FIG. 4.

Figure 6:
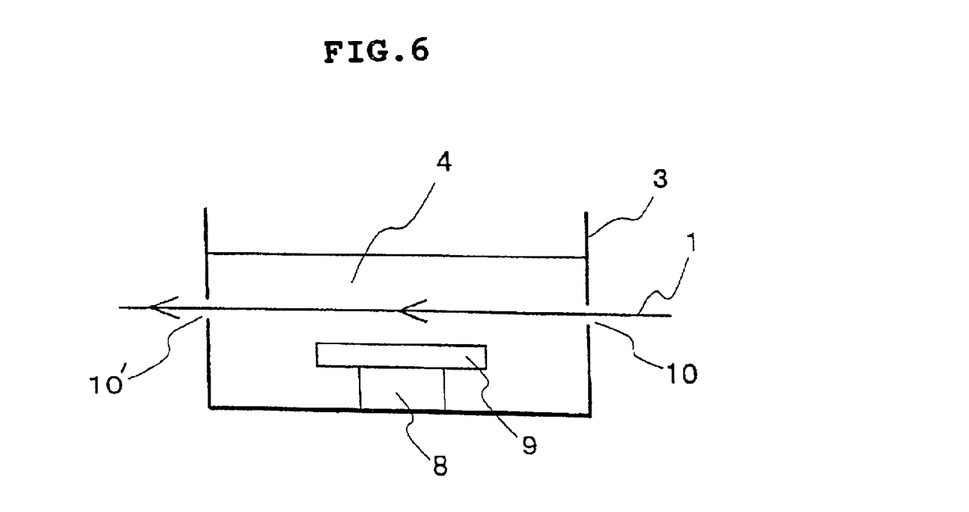
FIG. 6 schematically illustrates the construction of a further exemplary apparatus for attaching powder particles.

FIG. 6 schematically illustrates the construction of a further exemplary apparatus for attaching powder particles to a filmy substrate provided with a binder layer having tackiness. In the case of FIG. 6, the apparatus is so constructed that a container 3 is fixed, and a vibrating plate 9 is vibrated up and down by an electromagnetically vibrating device 8 installed on the bottom of the container. The filmy substrate 1 provided with the binder layer is passed through the container and a mixture 4 of the powder particles and medium contained therein through slits 10, 10' opened in the left and right walls of the container. The slit width must be made narrower than the diameter of the medium so as to prevent the medium from spilling out of the container through the slits. This system has not only merits that the treatment speed can be increased in the same manner as described in FIG. 5, and a doubleside treatment can be conducted, but also a merit that the structure can be simplified because there is no need to arrange any roll in the container. Incidentally, in the case of this embodiment, the electromagnetically vibrating device and the vibrating plate are used for vibration. However, these devices are not essential, and the system that the container is vibrated like the cases in FIGS. 4 and 5 may also be adopted.

In any of the drawings described above, the filmy substrate 1 is immersed in the mixture of the powder particles and medium. At this time, the pressure applied to the binder layer varies according to the depth of the immersion. Therefore, it is necessary to test a proper depth in advance. When the filmy substrate is placed too deeply, namely, the vibration from the medium is given to the binder layer of the filmy substrate placed under a high pressure, a possibility that the separation of the powder particles may occur is generally increased though it varies according to the density of the medium. It is hence not preferable that the filmy substrate be placed too deeply. Incidentally, in the case where the embedding of the powder particles in the binder layer is sufficiently achieved by bringing the binder layer side alone into light contact with the vibrating mixture of the powder particles and medium, such a method may be adopted.

In the above description as to FIGS. 4 to 6, the filmy substrate provided with the binder layer is described as a continuous material. However, when an internal reflecting layer of a liquid crystal cell is produced, a glass plate is used as a substrate. Therefore, the glass plate cannot be treated by the above-described processes. In such a case, it is only necessary to conduct a sheeting treatment that a glass plate provided with a binder layer is placed in the container as it is, or the glass plate is held by a proper jig in no contact with the vibrating container, vibration is given to the glass plate for a certain period of time in this state, and the glass plate is then taken out.

Since excessive powder particles adhere to the substrate due to interparticular force such as electrostatic force and Van der Waals force after laying the powder particles in the state of the monoparticle layer on the binder layer having tackiness, these powder particles must be removed. Examples of a method thereof include a method of scraping out by a blade, a method of scraping out by a brush or paint brush, a method of rubbing out by a cloth or the like, a method of blowing out by air blowing, a method of separating the excessive powder particles by ultrasonic waves to suck them, and a method of attaching on a weak gum roll. In order to completely remove the excessive powder particles, it is preferable to conduct wet cleaning with water or an aqueous solution added with a washing aid. As the wet cleaning, water jet that water is forcedly ejected from a nozzle to conduct washing is effective. With respect to fine particles having a particle diameter of 15 $\mu$m or smaller, there is a possibility that the mere removal by fluid pressure may be insufficient. Therefore, it is preferable to immerse the substrate in an ion-exchanged water added with a washing aid such as a surfactant to conduct ultrasonic washing and then sufficiently rinse the substrate with deionized water or the like. It is also necessary to finally remove water after conducting such a wet cleaning. As methods thereof, may be mentioned a method in which the wet substrate is passed between rubber rolls to squeeze out water, a method in which water is absorbed in and rubbed with a water absorbing roll or mat, and a method in which water is blown out with air blowing. When water cannot be completely removed by these methods according to the kinds of the substrate and powder particles, it is also necessary to separately apply cold air or hot air to the substrate for a sufficient period of time or heat the substrate by an infrared heater to dry it.

When a pressure sensitive adhesive is used as a binder, the above-described steps suffice for the production. When a UV-curable resin is used, or a high-boiling solvent remains, it is necessary to perform a step of curing the binder resin by UV irradiation or heating or of volatilizing out the remaining solvent before or after the step of removing the excessive powder particles.

When a filmy material is used as the substrate in the present invention, at least two steps among the step of coating with the binder layer, the step of attaching the powder particles (making use of the medium) and the step of removing the excessive powder particles can be continuously conducted. However, the filmy substrate cannot be taken up as it is after the binder layer having tackiness is provided as already described above. It is therefore necessary to be successively connected to any of the steps of laminating a release film on the binder layer once to take up the laminate, attaching the powder particles as it is, and bringing binder layer into contact with the powder particles and medium vibrated in the container. In the case of the roll obtained by laminating the release film on the binder layer having tackiness once to take up the laminate, the binder layer having tackiness exposed by separating the release film is also required to be successively connected to any of the steps of attaching the powder particles as it is, and bringing the binder layer into contact with the powder particles and medium vibrated in the container. When the step of attaching the powder particles to the binder layer having tackiness is performed, it is preferable from the viewpoint of efficiency that the subsequent step of bringing the binder layer into contact with the powder particles and medium be continuously conducted.

Since the binder layer, to which the powder particles have been attached, or which has been brought into contact with the powder particles and medium to embed the powder particles therein, no longer exhibits tackiness, such a substrate may be taken up as it is, and so the subsequent step is not necessarily conducted continuously. In this state, however, the powder particles adhere in a state of a multi-particular layer more than the monoparticle layer to the binder layer, and the powder particles also adhere to the back surface of the substrate. Therefore, when it is taken up as it is, dents may be caused on the substrate and binder in some cases layer. Accordingly, it is preferable that a step of removing excessive powder particles be continuously performed right after these steps. When the step of removing excessive powder particles is not continuously performed, it is necessary to devise the process so as not to apply such pressure that the above-described dents are caused to the substrate and binder layer by taking up the substrate with soft paper or synthetic resin film held between the rolled layers or taking up the substrate with tape-like paper or film held between rolled layers at both edges thereof.

A thin metal film is then laminated on the single-layer powder coating formed in the above-described manner to impart light reflecting ability. As a method for laminating the thin metal film, is used any ordinary method such as plating, vapor deposition or sputtering. As a material of the thin metal film, is use any of the above-described materials. However, gold, silver, aluminum or nickel is preferably selected due to its high light reflecting ability.

Another resin layer may be provided as a primer coating on the single-layer powder coating before laminating the thin metal film layer for the purpose of enhancing adhesion of the thin metal film to the single-layer powder coating. As a material thereof, is preferably used a material known as an anchor layer in plating, vapor deposition and sputtering. However, it should be kept in mind to select the material so as to prevent the arrangement of the powder particles laid in the single-layer powder coating from being disordered, destroyed or damaged upon the provision of this resin layer by a method such as coating or printing. When a paint or ink obtained by dissolving or diluting a resin material in or with an organic solvent is used, such a solvent is required that the binder layer containing the powder particles is not or scarcely swollen or dissolved. When an acrylic pressure sensitive adhesive is used as the material of the binder layer, any solvents high in solubility to acrylic resins, such as ketones, esters and aromatic hydrocarbon solvents, may not be used. In such a case, it is preferable to use water, alcohol or an aliphatic hydrocarbon solvent.

Figure 2A:
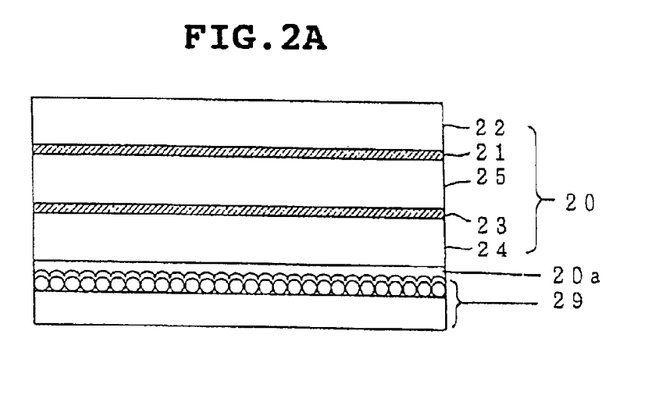
FIGS. 2A and 2B are cross-sectional views each typically illustrating a first reflection type liquid crystal display device according to an embodiment of the present invention.
Figure 2B:
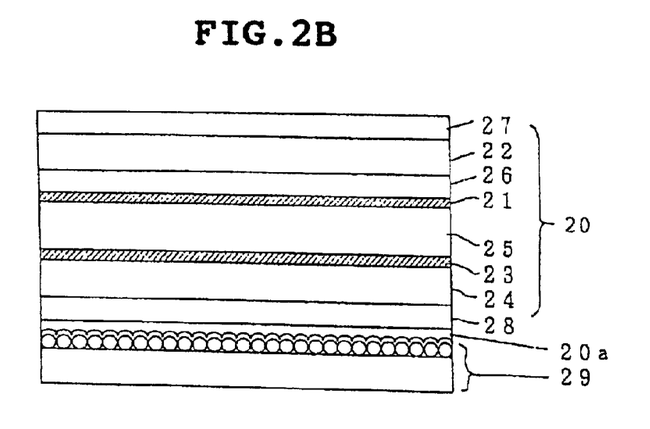

The reflection type liquid crystal display devices according to the present invention will now be described. The first liquid crystal display device has a structure comprising a liquid crystal cell with a liquid crystal layer held between a pair of transparent substrates opposed to each other and each having at least a display electrode on the internal side thereof, and the light reflecting plate according to the present invention, which is provided on the external side of one of the transparent substrates. FIGS. 2A and 2B are cross-sectional views each typically illustrating an exemplary reflection type liquid crystal display device according to an embodiment of the present invention. In FIGS. 2A and 2B, reference numeral 20 indicates a liquid crystal cell, and reference numeral 29 designates the light reflecting plate according to the present invention. In FIG. 2A, the liquid crystal cell has a structure that a liquid crystal layer 25 is held between a glass plate 22 provided with a display electrode 21 composed of a transparent electrode on its one surface and a glass plate 24 provided with a display electrode 23 composed of a transparent electrode on its one surface. In FIG. 2B, the liquid crystal cell has a structure that a liquid crystal layer 25 is held between a glass plate 22 provided with a display electrode 21 composed of a transparent electrode through a color filter 26 on its one surface and with a polarizing plate 27 on its other surface, and a glass plate 24 provided with a display electrode 23 composed of a transparent electrode on its one surface and with a polarizing plate 28 on its other surface. The light reflecting plate 29 according to the present invention is stuck with, for example, an adhesive 20*a* on the external side of one glass plate in each of these liquid crystal cells. In FIGS. 2A and 2B, the light reflecting plate is stuck in such a manner that the substrate of the light reflecting plate is turned outside. However, the light reflecting plate may also be stuck in such a manner that the thin metal film of the light reflecting plate is turned outside.

In the reflection type liquid crystal display devices according to the present invention, the liquid crystal cells, on which the light reflecting plate is stuck, are not limited to those described above, and any publicly known cells may also be used.

Figure 3A:
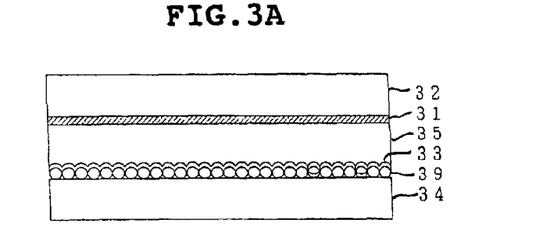
FIGS. 3A and 3B are cross-sectional views each typically illustrating a second reflection type liquid crystal display device according to another embodiment of the present invention.
Figure 3B:
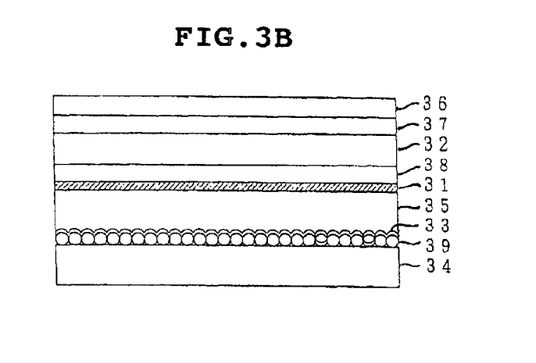

The second liquid crystal display device comprises a liquid crystal cell with a liquid crystal layer held between a pair of transparent substrates opposed to each other and each having at least a display electrode on the internal side thereof, and a light reflecting layer reflecting incident light, which is provided on the side of one display electrode within the liquid crystal cell. The light reflecting layer is composed of a single-layer powder coating formed on the transparent substrate by laying powder particles in a state of a monoparticle layer on the substrate to fix them, and a thin metal film laminated thereon. FIGS. 3A and 3B are cross-sectional views each typically illustrating an example thereof.

In FIG. 3A, the liquid crystal cell has a structure that a liquid crystal layer 35 is held between a glass plate 32 provided with a display electrode 31 composed of a transparent electrode and a glass plate 34 provided with a display electrode 33. In FIG. 3B, the liquid crystal cell has a structure that a liquid crystal layer 35 is held between a glass plate 32 provided with a polarizing plate 36 and a phase difference plate 37 on its one surface and with a display electrode 31 composed of a transparent electrode through a color filter 38 on its other surface, and a glass plate 34 provided with a display electrode 33 composed of a light reflecting layer. In FIGS. 3A and 3B, each display electrode 33 is composed of a thin metal film laminated on the single-layer powder coating 39 formed according to the above-described process, becomes a component of the light reflecting layer and has both functions of the display electrode and the light reflecting layer.

The above-described examples of the reflection type liquid crystal display devices are cases where the display electrode functions as the light reflecting layer. Examples of the construction of the light reflecting layer include the following 3 cases. Namely, there may be mentioned 3 layer structures of (1) a case where a thin metal film combining a display electrode with a reflecting film is provided on a single-layer powder coating formed, (2) a case where a display electrode is produced by an ordinary process, and a light-reflecting layer composed of a single-layer powder coating and a thin metal film is laminated on the display electrode, and (3) a case where after the light-reflecting layer composed of the single-layer powder coating and the thin metal film is laminated, an insulating layer and a display electrode are provided thereon. With respect to these structures, advantages upon production and predominance from the viewpoint of display properties cannot be unqualifiedly said because the kinds of the liquid crystal and operation mode used, the structure of the display electrode, etc. are complicatedly entangled. However, the case (1) is most preferred in view of less production steps.

In the above-described cases, as a material for the binder layer for forming the light reflecting layer, a resin material high in heat resistance, such as polyimide, polyimide-amide or a silicone resin, is used in place of the acrylic pressure sensitive adhesive. With respect to these resin materials, in the case of the polyimide, it is applied in a state of amic acid which is a precursor thereof, or in a state of a resin solution containing a high-boiling solvent, thereby forming a binder layer in a state that tackiness has been retained. The powder particles are attached and fixed to this binder layer, excessive powder particles are then removed, the binder layer is heated to a high temperature to polyimidate it or completely volatilize the solvent, whereby the light reflecting layer can be formed. In the case where the substrate is glass, as a coating method, is preferably used a coating method used in production of an ordinary liquid crystal cell, such a spin coating, roll coating or CAP coating.

Since the light reflecting plates according to the present invention are produced in accordance with the above-described construction and process, they can be produced as those exhibiting reflection properties wider than the conventional reflecting plates, and paper whiteness can be realized. Since the degree of irregularities in the surface of the single-layer powder coating can be controlled, a reflecting plate having the intended reflection properties can be produced with good reproducibility. Accordingly, the use of the light reflecting plate according to the present invention permits producing a reflection type liquid crystal display device having good paper whiteness.

EXAMPLE

The present invention will hereafter be described in more detail by the following example. However, the present invention is not limited to this example.

An acrylic pressure sensitive adhesive (H6F or TM206, trade name, product of Soken Chemical & Engineering Co., Ltd.) was applied to a transparent easy-adhesive PET film (Merinex 75, product of ICI Japan Limited) having a thickness of 75 μm, and dried to provide a binder layer shown in Table 1. Spherical methylsilicone fine particles (Tospearl 145, trade name, product of GE Toshiba Silicone Co., Ltd.) having a volume average particle diameter of 4.5 μm and a particle diameter distribution of 0.94 were used, and the PET film having the binder layer was passed through a fluidized bed in which the spherical fine particles had been contained, thereby attaching the spherical fine particles to the binder layer. On the other hand, truly spherical zirconia beads having a particle diameter of 0.5 mm as a medium and the above-described methylsilicone fine particles were placed in a proportion of 100 parts to 3 parts in a vibrating tank, and the PET film, to which the spherical fine particles had been attached, was passed through the vibrating tank while vibrating the medium and the spherical fine particles, thereby uniformly embedding the spherical fine particles in the binder layer. Excessive spherical fine particles were removed by washing with water, thereby preparing 4 samples provided with a single-layer powder coating on the PET film. With respect to one of these samples, a UV-curable acrylate (UV-3300, trade name, product of Toagosei Chemical Industry Co., Ltd.) was further applied to the single-layer powder coating thereof to provide a top coating layer having a dry coating weight of 1.0 g/m$^2$.

Details of the samples (S'-1 to S'-4) prepared in the above-described manner are shown in Table 1. A total light transmittance, Tt (%) and haze, Hz (%) of each of these samples were measured by means of an NDH2000 manufacture by Nippon Denshoku Kogyo K. K. With respect to cases where incident light was applied from the side of the transparent substrate and from the side of the single-layer powder layer, the measured results are shown in Table 1.

TABLE 1

| | | | | Optical properties | | | |
|---|---|---|---|---|---|---|---|
| Sample name | Pressure sensitive adhesive | Thickness of binder layer (μm) | Top coating layer | Incidence of light from the single-layer powder coating side | | Incidence of light from the transparent substrate side | |
| | | | | Tt | Hz | Tt | Hz |
| S'-1 | H-6F | 2.5 | Not applied | 95.0 | 59.5 | 95.0 | 59.4 |
| S'-2 | TM206 | 3.0 | Not applied | 98.4 | 90.0 | 63.7 | 88.8 |
| S'-3 | H-6F | 1.5 | Not applied | 95.4 | 74.3 | 91.7 | 74.2 |
| S'-4 | TM206 | 3.0 | Applied | 90.0 | 60.4 | 88.8 | 60.0 |

Figure 7:
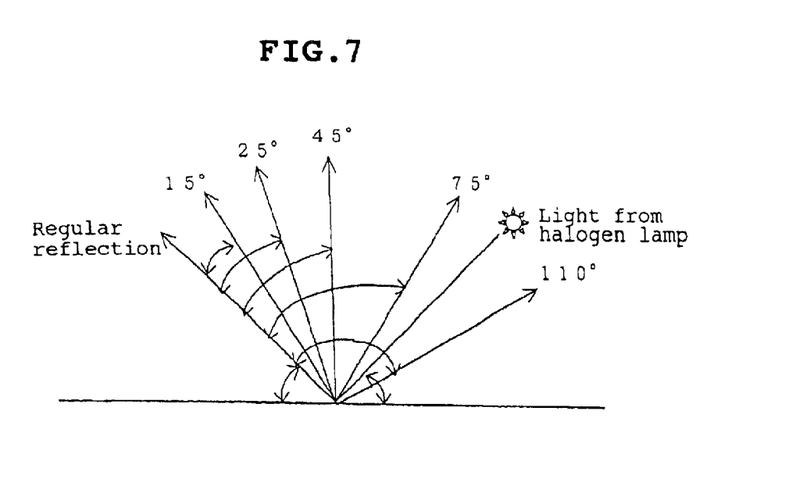
FIG. 7 illustrates measurements of a quantity of light reflected and a color difference as to each of samples according to an Example.
Figure 8:
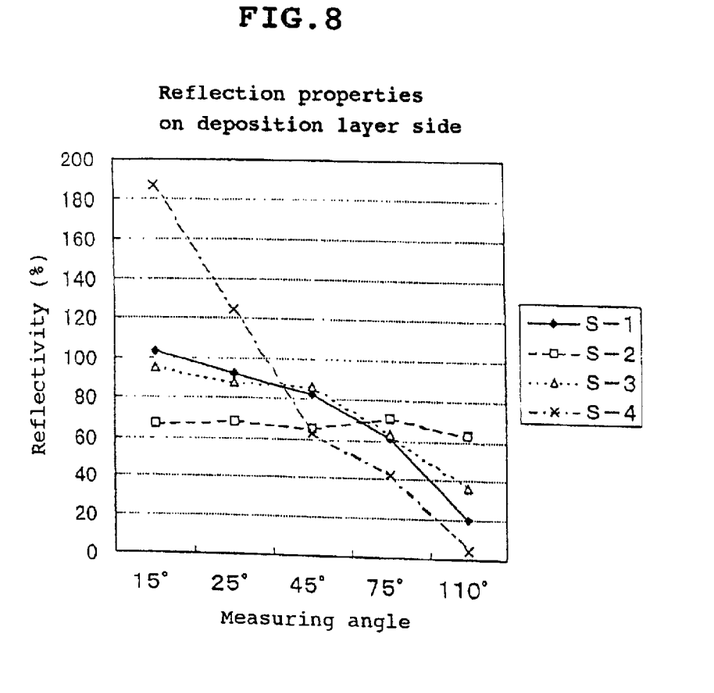
FIG. 8 diagrammatically illustrates reflection properties on the side of a deposited layer of each of the samples according to the Example.
Figure 9:
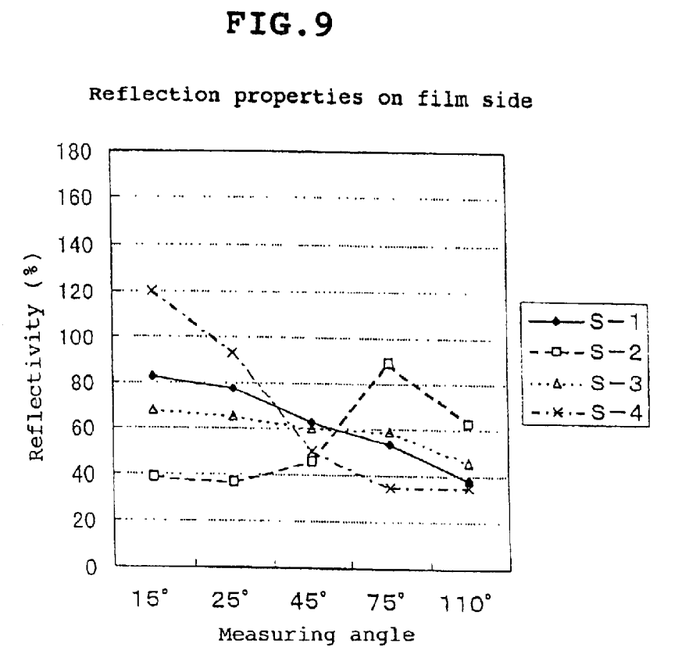
FIG. 9 diagrammatically illustrates reflection properties on the side of a film of each of the samples according to the Example.

Aluminum was deposited on the single-layer powder coating of each of these samples, thereby providing an aluminum deposition film having a thickness of about 700 Å to produce light reflecting plates (S-1 to S-4) according to the present invention. With respect to these 4 light reflecting plate samples, the reflection properties were measured by means of a multiangle spectrocolorimeter (manufactured by Color Technosystem Co.). This measuring device can measured the quantities of light reflected in directions of 5 angles of 15°, 25°, 45°, 75° and 110° from the angle of regular reflection and color differences by irradiating the surface of each sample with light from a halogen lamp from an angle of 45° to the sample as shown in FIG. 7. The relationship between the measuring angle and the reflectivity in the surface of the deposition layer of each sample is shown in FIG. 8. The reflectivity as used herein is expressed as % of a proportion of the quantity of light reflected on the sample surface to a standard white plate. The measuring wavelength is 550 nm. Similarly, the results measured with the transparent PET side turned front are shown in FIG. 9.

According to these measured results, with respect to the reflection properties on the deposition layer side, S-2 great in the degree of irregularities exhibits uniform reflection at all the angles, and S-4 smallest in the degree of irregularities becomes great in the reflection component in the direction of regular reflection. These reflection properties almost correspond to the haze shown in Table 1. S-1 and S-4 exhibit almost the same values as to the haze. However, S-4 was subjected to top coating, and so the substantial irregularities of S-4 become smaller than S-1 to make a difference in the reflection properties. On the other hand, with respect to the reflection properties on the film side, the reflectivities in the directions of 75° and 110° become great in the case of S-2. This is due to the fact that S-2 exhibits retroreflection because the degree of projection of the fine particles in the single-layer powder coating is great.

Incidentally, color differences in terms of Lab indication were measured by means of the multi-angle spectrocolorimeter. As a result, all the samples were almost neutral colors. When the 4 samples were visually compared with one another, S-2 was almost near to white, and S-1 and S-3 were also not observed exhibiting metallic gloss. However, S-4 exhibited metallic gloss.

As apparent from the above results, according to the present invention, the degree of embedding of fine particles, i.e., the degree of irregularities in the single-layer powder coating is controlled, whereby the reflection properties exhibited by the thin metal film laminated thereon can be greatly changed even when fine particles having the same particle diameter were used. It is naturally understood that the reflection properties can be changed to a greater extent by varying the size of the fine particles.

What is claimed is:

1. A light reflecting plate comprising:

a substrate provided with a binder layer having tackiness, a single-layer powder coating provided on the substrate by laying powder particles in a state of a monoparticle layer such that said powder particles are fixed by the binder layer to cover the substrate, and a thin metal film laminated directly or via a primer coating on the individual particles of the single-layer powder coating.

2. The light reflecting plate according to claim 1, wherein the powder particles are spherical fine particles having a particle diameter of 1 to 20 µm.

3. The light reflecting plate according to claim 1, wherein the substrate is in the form of a plate or film.

4. The light reflecting plate according to claim 1, wherein the substrate and/or the powder particles have light transmission property.

5. The light reflecting plate according to claim 1, wherein the thin metal film is formed from any one metal selected from the group consisting of gold, silver, aluminum and nickel.

6. A process for producing the light reflecting plate according to claim 1, which comprises the steps of:

providing a binder layer having tackiness on a substrate, forming a single-layer powder coating by laying powder particles in a state of a monoparticle layer on the binder layer having tackiness such that said powder particles are fixed by the binder layer to cover the substrate, and laminating a thin metal film directly or via a primer coating on the individual particles of said single-layer powder coating.

7. The process according to claim 6, wherein the substrate provided with the binder layer having tackiness is brought into contact with a vibrating mixture of the powder particles and a medium in a container, thereby laying the powder particles in a state of a monoparticle layer on the binder layer having tackiness such that said powder particles are fixed by the binder layer to cover the substrate.

8. A liquid crystal display device comprising:

a liquid crystal cell with a liquid crystal layer held between a pair of transparent substrates opposed to each other and each having at least a display electrode on the internal side thereof, and a light reflecting plate reflecting incident light, which is provided on the external side of one of the transparent substrates, wherein the light reflecting plate comprises a substrate provided with a binder layer, a single-layer powder coating provided on the substrate by laying powder particles in a state of a monoparticle layer such that said powder particles are fixed by the binder layer to cover the substrate, and a thin metal film laminated directly or via a primer coating on the individual particles of the single-layer powder coating.

9. A liquid crystal display device comprising:

a liquid crystal cell with a liquid crystal layer held between a pair of transparent substrates opposed to each other and each having at least a display electrode on the internal side thereof, and a light reflecting layer reflecting incident light, which is provided on the side of one display electrode within the liquid crystal cell, wherein the light reflecting plate comprises a substrate provided with a binder layer, a single-layer powder coating provided on the substrate by laying powder particles in a state of a monoparticle layer such that said powder particles are fixed by the binder layer to cover the substrate, and a thin metal film is laminated directly or via a primer coating on the individual particles of the single-layer powder coating.

* * * * *